Patented Oct. 24, 1950

2,527,377

UNITED STATES PATENT OFFICE 2,527,377

THIOACETAL PRODUCTS

Joseph C. Patrick, Morrisville, Pa., assignor to Thiokol Corporation, Trenton, N. J., a corporation of Delaware No Drawing. Application April 18, 1946, Serial No. 663,245

3 Claims. (Cl. 260—609)

This application relates to polymers and monomers obtained by reaction between aldehydes and thioglycerol halohydrins and some of the uses of the products thereby obtained, including the use thereof in the manufacture of polysulfide polymers and in lubrication.

As a result of the invention products are provided including the following:

1. Polyhalogenated derivatives useful in the production of polysulfide polymers having a controlled space lattice structure.
2. Lubricants, especially high pressure lubricants.

The invention also includes a process or method of lubrication involving the products of the invention.

In accordance with the invention a thioglycerol halohydrin is reacted with an aldehyde. Aldehydes in general are employed including by way of preference, in the order named, formaldehyde, acetaldehyde, propionaldehyde, butyraldehyde and their homologues, furfuraldehyde, benzaldehyde, and the sugars and saccharides which are aldehydes or yield aldehydes on acid treatment or hydrolysis.

The halohydrins of thioglycerine in general are employed including the prominent species 1 mercapto 2,3 dihalopropane, 1,3 dihalo 2 mercapto propane, the alpha monohalothiohydrin and the beta monohalothiohydrin.

The reactions involved in the invention are illustrated as follows, chlorine being used to symbolize a halogen atom.

I
$$2H_2C(ClCH_2).C(H).CSH + CH_2O \longrightarrow H_2C(ClCH_2).C(H).C.S.CH_2.S.C(H).C.CH_2(H_2ClCl)$$

II
$$2H_2C(ClHCl).C.CH_2(SH) + CH_2O \longrightarrow$$
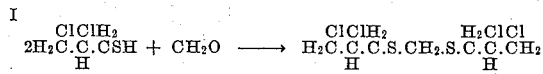

III (a)
$$H_2C=C(H).CSH + CH_2O \longrightarrow H_2C=C(H_2).C(H_2).S.CH_2.S.C(H_2).C=CH_2(H_2H)$$

(b)
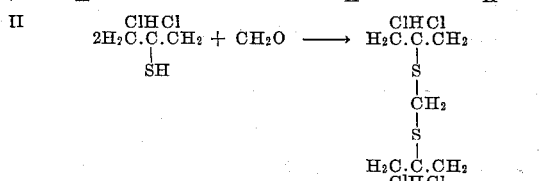

IV
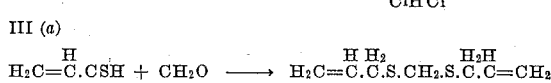
(Polymer)

V
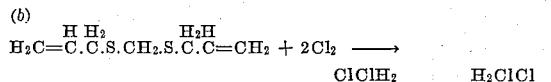

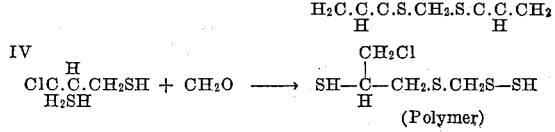
(Polymer)

In Reactions I and II the thiohydrin is monofunctional as to the mercapto group and monomeric products, di(2,3 dichloro n-propyl) thioformal and di(2,3 dichloro isopropyl) thioformal are obtained, respectively.

Reaction III shows a different method for producing the product of Reaction I.

In Reactions IV and V the halothiohydrins are bifunctional and reaction with aldehydes produces polymers, so indicated in the chemical reaction symbolically written. The products obtained are all thioacetals, monomeric or polymeric. When formaldehyde is used, the products are thioformals. The products obtained by Reactions IV and V may be described as polyhalopropyl, polythioacetals or specifically as polychlorpropyl polythioformals.

Specific details of the above reactions are given as follows, the numbers of the examples corresponding to the numbers assigned to the above reactions.

Example I

Two mols of 2,3 dichloro 1 mercapto propane are dissolved in about 200 cubic centimeters of benzene and slightly more than 1 mol of formaldehyde, preferably in the form of paraformaldehyde, is added. A trace of acid catalyst is put into the mixture such as, for example, one drop of concentrated hydrochloric acid, and the mixture is refluxed at the boiling point of benzene in an esterification flask fitted with a trap for the removal of water and connected so that the benzene will be continuously returned to the reaction flask. The refluxing with removal of water is continued until substantially one mol or 18 cubic centimeters of water have been removed. The mixture in the flask is then transferred to a regular distilling apparatus and the benzene is distilled off, leaving the reaction product which is the tetrachloro dipropyl thioformal. The product obtained is a slightly viscous liquid boiling at 145–148° C. at 3 mm. pressure and having a specific gravity of 1.35.

Example II

Proceed as above, substituting 1,3 dichloro 2 mercapto propane for the 2,3 dichloro 1 mercapto propane. The product is a white crystalline solid, melting at 53° C. and boiling at 130–132° C. at 2 mm. pressure.

Example II A

Proceed as in either of examples one or two, substituting a mixture of the chloro compounds for the single compounds. The product is a liquid.

Example III

Two mols of allyl mercaptan are treated with slightly more than one mol of formaldehyde in the presence of a trace of acid, e. g., HCl as a catalyst, to give diallyl formal. The ethylenic linkages are then saturated with a halogen to give a tetrahalo compound corresponding to the product formed in Example I. The preferred method of performing this reaction is to dissolve the diallyl formal in CCl$_4$ and add the halogen in solution in CCl$_4$ to the solution of diallyl formal compound.

Example IV

Proceed as in Example I or II, substituting 1,3 dimercapto 2 chloro propane (alpha monochlorthiohydrin)

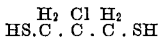

for the dichloro compounds of Examples I and II, respectively, and slightly more than 2 mols of formaldehyde. A polymer is formed which is a viscous amber liquid, specific gravity 1.26. By reacting for a longer time, a wax is obtained.

Example V

Proceed as in Example IV, substituting 2,3 dimercapto 1 chloro propane (beta monochlorthiohydrin)

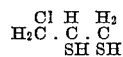

for the alpha thiohydrin. The product obtained is similar to that of Example IV.

All the above products have high lubricating values. This is shown by placing between metal plates then subjecting to high pressure, e. g., 5000 pounds per square inch for about one hour, then removing the pressure. In the case of ordinary lubricants so little is left that friction between the remaining surfaces is very high. In the lubricants of this invention the liquid is retained so tenaciously that the surfaces are effectively lubricated, i. e., the film of liquid is not squeezed out and remains in contact with the surfaces.

The products may be used as such or dissolved in solvents including lubricating oil. They are soluble in mineral oils and glycerides and generally in hydrocarbons aliphatic and aromatic. Many of them are insoluble in water.

In a number of pending applications of the applicant, reference is made to technique involving the reaction of soluble sulfides and polysulfides with organic compounds containing three or more carbon-attached substituents, e. g., halogens, split off by reaction with said polysulfide whereby polymers are obtained having a space lattice structure or cross linkage. Reference is also made to the production of copolymers having a controlled density of cross-linkage by reacting a mixture of a compound containing three or more such substituents and a compound containing only two such substituents, the latter compound producing only linear growth and thus serving to space the bridging or cross linkage structure produced by the compound containing three or more of such substituents (e. g., halogen substituents).

The compounds of the present invention, monomeric and polymeric, all possess three or more of such substituents and are very well adapted for use in said technique and such use constitutes a part of the present invention and will be further illustrated by the following example.

Example VI

Three liters of a 2 molar solution of sodium disulfide are placed in a three-necked flask or five liter capacity equipped with means for mechanical agitation and a thermometer to indicate temperatures. To this solution is added a solution of 10 grams of NaOH in 15 cc. of water followed by a solution of 25 grams of crystallized magnesium chloride (MgCl$_2$.6H$_2$O) in 50 cc. of water. The mixture is heated at a temperature of about 160° F., and to it are added a mixture of 5 mols of BB' dichlordiethyl formal and 0.025 mols of either of the compounds obtained by Reactions I, II, or III or the equivalent proportions of the polymers obtained by Reactions IV and V. The addition of the mixed chlorides is carried out slowly in such a manner that the complete addition requires about one hour.

During the addition of the mixed chlorides an exothermic condition takes place, and the temperature rises to about 180° F. When the reaction is completed, the temperature is maintained at 180° F. for approximately one hour, after which the latex that has been formed as a result of the reaction is permitted to settle out of the reaction liquid and the supernatant liquid is then removed by decantation or siphoning.

The latex is treated with successive washes of warm water until entirely free from water-soluble impurities, after which it is transferred to a suitable receptacle and dilute acid is added until the reaction of the supernatant liquid is brought to a pH of about 6, whereupon a phenomenon analogous to coagulation of rubber latex takes place. The coagulum so formed is then kneaded with cold water until every trace of residual acid is removed, after which the soft elastic mass is dried.

For the sake of convenience the compounds containing three or more functional substituents, i. e., substituents (e. g., halogen atoms) split off by reaction with the soluble polysulfide, will be referred to as multifunctional and those containing only two such substituents as bifunctional. In the above example bifunctional compounds in general may be substituted for the dichlordiethyl formal. There are of course a large number of these. See, for example, the large number set forth in Patrick U. S. Patent 2,216,044, September 24, 1940. The ratio of multifunctional to bifunctional compound may be varied from a molar ratio of about 1 to 1000 to a molar ratio of about 1 to 50. In this way a wide variety of properties may be obtained according to change in density of the cross linkage structure. The maximum density is obtained by omitting the bifunctional compound and using, for example, somewhat more than $n-1$ mols of soluble polysulfide where $n$ is the number of halogen atoms or other equivalent functional substituents in the multifunctional compound.

It is generally preferred, however, to have a molar preponderance of bifunctional compound in relation to the multifunctional compound, preferred ranges of such ratios varying from about 50 to 1 to 1000 to 1.

In the above reaction of Example VI various soluble sulfides may be substituted for the sodium disulfide; in fact, soluble sulfides in general may be so substituted, e. g., soluble sulfides having the formula $MS_{2 \text{ to } 6}$ where M is an alkali or alkaline earth metal or ammonium or substituted ammonium. Moreover, the corresponding monosulfides may be also substituted. Various mixtures of monosulfides and polysulfides may also be used.

This application is a continuation-in-part of copending application Serial No. 554,545, filed September 16, 1944, now abandoned.

What is claimed is:

1. As a new composition of matter a symmetrical tetrahalopropyl thioformal.
2. As a new composition of matter di(2,3 dichloro n-propyl) thioformal.
3. As a new composition of matter di(1,3 dichloroisopropyl) thioformal.

JOSEPH C. PATRICK.

REFERENCES CITED

The following references are of record in the file of this patent:

UNITED STATES PATENTS

| Number | Name | Date |
|---|---|---|
| 396,526 | Baumann | Jan. 22, 1889 |
| 2,213,988 | Lincoln et al. | Sept. 10, 1940 |
| 2,229,665 | Mochel | Jan. 28, 1941 |
| 2,369,612 | Schirm | Feb. 13, 1945 |

OTHER REFERENCES

Levi, "Gazz. Chim. It.," vol. 62, (1932), pages 775–780.